United States Patent
Choi

(10) Patent No.: US 10,191,148 B2
(45) Date of Patent: Jan. 29, 2019

(54) RADAR SYSTEM FOR VEHICLE AND METHOD FOR MEASURING AZIMUTH THEREIN

(71) Applicant: MANDO CORPORATION, Pyeongtaek-si, Gyeonggi-do (KR)

(72) Inventor: Jong Hwan Choi, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 571 days.

(21) Appl. No.: 14/306,849

(22) Filed: Jun. 17, 2014

(65) Prior Publication Data
US 2015/0160334 A1 Jun. 11, 2015

(30) Foreign Application Priority Data
Dec. 9, 2013 (KR) .......................... 10-2013-0152413

(51) Int. Cl.
*G01S 13/02* (2006.01)
*G01S 7/28* (2006.01)
(Continued)

(52) U.S. Cl.
CPC ............ *G01S 13/02* (2013.01); *G01S 7/2813* (2013.01); *G01S 7/354* (2013.01); *G01S 7/4021* (2013.01);
(Continued)

(58) Field of Classification Search
CPC .......... G01S 7/41; G01S 7/414; G01S 7/2806; G01S 7/2813; G01S 7/354; G01S 7/4021;
(Continued)

(56) References Cited

U.S. PATENT DOCUMENTS 3,938,154 A * 2/1976 Lewis ................... G01S 7/2813
342/381
6,246,365 B1 * 6/2001 Tokoro ................... G01S 13/42
342/149

(Continued)

FOREIGN PATENT DOCUMENTS

| CN | 102944866 A | 2/2013 |
| DE | 102 56 524 A1 | 7/2004 |
| KR | 1020110126939 A | 11/2011 |

OTHER PUBLICATIONS

Chinese Office Action for corresponding Chinese Patent Application No. 201410281373.0 dated Aug. 17, 2016.
(Continued)

*Primary Examiner* — Timothy A Brainard
*Assistant Examiner* — Daniel P Malley, Sr.
(74) *Attorney, Agent, or Firm* — Hauptman Ham, LLP

(57) ABSTRACT

Provided are a radar system for a vehicle and a method for measuring an azimuth therein, which are capable of increasing target sensing and tracking reliability by blocking an error signal that is input from the ground where no vehicle exists or in the elevation angle direction. A system for blocking an error signal input from a ground or in an elevation angle direction includes: two or more main reception antennas; a single side lobe suppression antenna; and a radar configured to compare a magnitude of a main reception signal received from the main reception antenna with a magnitude of a side lobe suppression reception signal received from the side lobe suppression antenna, and measure an azimuth of a target by using the received main reception signal when the magnitude of the main reception signal is larger than the magnitude of the side lobe suppression reception signal.

4 Claims, 5 Drawing Sheets

(51) Int. Cl.
*G01S 7/35* (2006.01)
*G01S 7/40* (2006.01)
*G01S 13/42* (2006.01)
*G01S 13/93* (2006.01)
*H01Q 1/32* (2006.01)
*H01Q 3/26* (2006.01)
*H01Q 13/20* (2006.01)
*H01Q 21/06* (2006.01)

(52) U.S. Cl.
CPC ............ *G01S 13/42* (2013.01); *G01S 13/931* (2013.01); *H01Q 1/3233* (2013.01); *H01Q 3/2635* (2013.01); *H01Q 13/206* (2013.01); *H01Q 21/065* (2013.01)

(58) Field of Classification Search
CPC ........ G01S 13/02; G01S 13/42; G01S 13/931; G01S 13/762; H01Q 1/3233; H01Q 3/2629; H01Q 3/2635; H01Q 13/206; H01Q 21/065
See application file for complete search history.

(56) References Cited

U.S. PATENT DOCUMENTS

| | | | | |
|---|---|---|---|---|
| 6,266,005 B1* | 7/2001 | Schneider | ............... | G01S 13/42 342/118 |
| 6,429,804 B1* | 8/2002 | Kishida | ................... | G01S 13/34 340/435 |
| 6,867,726 B1* | 3/2005 | Yu | ........................ | G01S 7/2813 342/149 |
| 2004/0178943 A1* | 9/2004 | Niv | ........................ | G01S 13/50 342/29 |
| 2004/0257265 A1* | 12/2004 | Gottwald | ............... | H01Q 1/325 342/70 |
| 2006/0250296 A1* | 11/2006 | Focke | ..................... | G01S 7/032 342/70 |
| 2007/0018882 A1* | 1/2007 | Manoogian | ......... | G01S 13/4418 342/80 |
| 2008/0211720 A1* | 9/2008 | Hansen | .................. | H01Q 9/045 343/700 MS |
| 2009/0021429 A1* | 1/2009 | Colburn | ................. | H01Q 25/02 342/374 |
| 2009/0267822 A1* | 10/2009 | Shinoda | ................. | G01S 7/352 342/70 |
| 2012/0169525 A1* | 7/2012 | Klar | ...................... | G01S 7/4004 342/70 |
| 2014/0159955 A1* | 6/2014 | Schuman | .............. | G01S 7/2813 342/367 |
| 2014/0178943 A9* | 6/2014 | Shibuya | ................. | C07H 17/04 435/97 |

OTHER PUBLICATIONS

German Office Action dated Apr. 30, 2018 in connection with the counterpart German Patent Application No. 10 2014 009 093.0.

* cited by examiner

# RADAR SYSTEM FOR VEHICLE AND METHOD FOR MEASURING AZIMUTH THEREIN

CROSS-REFERENCE(S) TO RELATED APPLICATION

This application claims the benefit of Korean Patent Application No. 10-2013-0152413, filed on Dec. 9, 2013, in the Korean Intellectual Property Office, the contents of which are incorporated herein by reference in its entirety.

BACKGROUND OF THE INVENTION

Field of the Invention

The present invention relates to a radar system for a vehicle and a method for measuring an azimuth therein, and more particularly, to a radar system for a vehicle and a method for measuring an azimuth therein, which are capable of increasing target sensing and tracking reliability by blocking an error signal that is input from the ground where no vehicle exists or in an elevation angle direction.

Description of the Related Art

With vehicle intelligence, the existing vehicles are mounted with various vehicle control systems, such as an Adaptive Cruise Control (ACC) system for sensing a lane departure, a Lane-Change Assist (LCA) system for sensing a lane behind a vehicle, a STOP & GO system for front detection and collision avoidance, a parking assist system for parking control, a Lane-Change Assist (LCA)/Blind-Spot Detection (BSD)/Rear Pre Crash (RPC) system for sensing back-sideways to detect vehicles entering from adjacent lanes and performing collision warning collision avoidance, and the like.

Such various vehicle control systems include radars that can detect a target.

The radar can obtain information such as a distance, angle and velocity of a reflecting object by radiating an electromagnetic signal of a specific frequency to a space and collecting a weak echo signal.

As one example, a vehicle control system employing such radar is disclosed in Korean Patent Application Publication No. 10-2011-0126939 (published on Nov. 24, 2011, entitled "INTEGRATED RADAR SYSTEM AND VEHICLE CONTROL SYSTEM").

In particular, since a radar system for a vehicle is operated in an environment where various structures as well as vehicles exist, it is necessary to accurately distinguish main signals from error signals.

However, since a conventional radar system for a vehicle calculates only an angle of a reception signal of an azimuth direction and does not calculate an angle in an elevation direction, the conventional radar system cannot distinguish a main signal and an error signal of an elevation angle direction.

In addition, in the past, the elevation angle has not been measured as limitation specifications such as costs and sizes of products, and beam patterns have been designed to maintain a low side lobe level in regions other than a sensing range (main beam).

Therefore, a main signal may be influenced by signals reflected from the ground or self-vehicle wheel signals, or signals reflected from the ceiling when passing through tunnels, and it is likely that false sensing will occur.

CITATION LIST

Patent Literature

Korean Patent Application Publication No. 10-2011-0126939 (Nov. 24, 2011) entitled "INTEGRATED RADAR SYSTEM AND VEHICLE CONTROL SYSTEM"

SUMMARY OF THE INVENTION

An aspect of the present invention is directed to provide a radar system for a vehicle and a method for measuring an azimuth therein, which are capable of increasing target sensing and tracking reliability by blocking an error signal that is input from the ground where no vehicle exists or in an elevation angle direction.

According to an embodiment of the present invention, a system for blocking an error signal input from a ground or in an elevation angle direction includes: two or more main reception antennas; a single side lobe suppression antenna; and a radar configured to compare a magnitude of a main reception signal received from the main reception antenna with a magnitude of a side lobe suppression reception signal received from the side lobe suppression antenna, and measure an azimuth of a target by using the received main reception signal when the magnitude of the main reception signal is larger than the magnitude of the side lobe suppression reception signal.

The main reception antenna may include a phase delay unit installed in a center of a line to adjust a first phase and a second phase to same phase, and the side lobe suppression antenna may include a vertical connection part installed in a center of a line to adjust a phase difference between the first phase and the second phase to 180 degrees.

The radar may include: a reception unit configured to receive the main reception signal and the side lobe suppression reception signal, which are reflected and returned from the target, from the main reception antennas and the side lobe suppression antenna; a determination unit configured to compare the magnitudes of the main reception signal and the side lobe suppression reception signal, which are received by the reception unit, and determine whether the magnitude of the main reception signal is larger than the magnitude of the side lobe suppression reception signal; and an azimuth measurement unit configured to, when it is determined by the determination unit that the magnitude of the main reception signal is larger, measure the azimuth of the corresponding target by using the main reception signal within intersecting points between the main reception signal and the side lobe suppression reception signal.

The determination unit may determine whether the magnitude of the main reception signal is larger than the magnitude of the side lobe suppression reception signal at the intersecting point.

According to another embodiment of the present invention, a method for measuring an azimuth in a system for blocking an error signal input from a ground or in an elevation angle direction includes: receiving main reception signals, which are reflected and returned from a target, from two or more main reception antennas; receiving a side lobe suppression reception signal, which is reflected and returned from the target, from a single side lobe suppression reception antenna; and comparing a magnitude of the main reception signal received from the main reception antenna with a magnitude of the side lobe suppression reception signal received from the side lobe suppression antenna, and measuring an azimuth of the target by using the received main reception signal when the magnitude of the main reception signal is larger than the magnitude of the side lobe suppression reception signal.

The step of measuring the azimuth of the target may include: determining intersecting points between the main reception signal and the side lobe suppression reception signal; determining whether the magnitude of the main reception signal is larger than the magnitude of the side lobe suppression reception signal at the determined intersecting points; and when it is determined that the magnitude of the main reception signal is larger, measuring the azimuth of the corresponding target by using the main reception signal within the intersecting points.

DETAILED DESCRIPTION OF EXEMPLARY EMBODIMENTS

Hereinafter, preferred embodiments of the present invention will be described below in detail with reference to the accompanying drawings.

Figure 1:
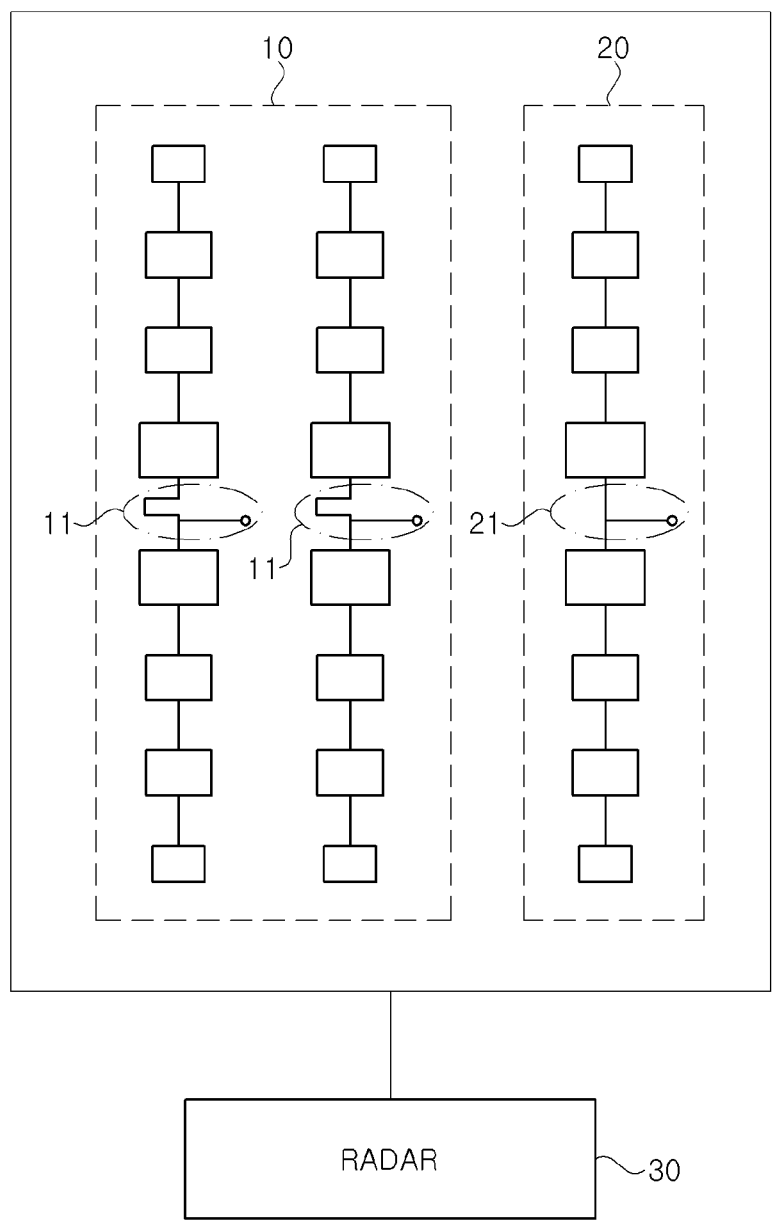
FIG. 1 is a diagram for describing a radar system for a vehicle according to an embodiment of the present invention.
Figure 2:
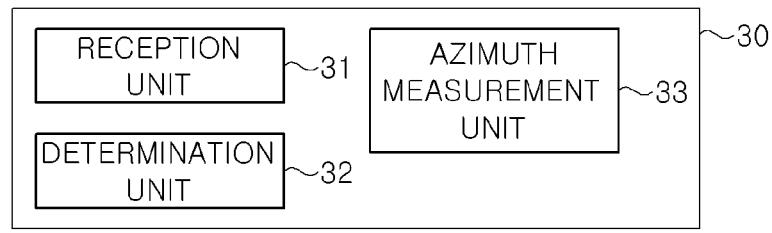
FIG. 2 is a block diagram for describing a radar illustrated in FIG. 1.

FIG. 1 is a diagram for describing a radar system for a vehicle according to an embodiment of the present invention, and FIG. 2 is a block diagram for describing a radar illustrated in FIG. 1.

Referring to FIG. 1, the radar system for the vehicle according to the embodiment of the present invention includes two or more main reception antennas 10, a side lobe suppression antenna 20, and a radar 30. The radar 30 receives signals, which are reflected and returned from a target, from the main reception antennas 10 and the side lobe suppression antenna 20, and measures an azimuth of the target by using the received signals.

The main reception antennas 10 receive echo signals returned after beams are radiated to a transmission antenna (not illustrated), that is, signals reflected and returned from the target. Herein, as the main reception antennas 10, two or three reception antennas may be used.

A plurality of patch antennas (not illustrated) are installed in the main reception antennas 10. The plurality of patch antennas are connected by lines. Phase delay units 11 are provided in the centers of the lines. The phase delay units 11 may adjust a first phase and a second phase to the same phase with reference to the centers of the lines. The main reception signals adjusted to the same phase are output to the radar 30.

The side lobe suppression antenna 20 is an antenna having a beam pattern that is a higher level than a beam pattern of the main reception antenna 10. The side lobe suppression antenna 20 may block the side lobe of the beam pattern of the main reception antenna 10. The side lobe suppression antenna 20 includes a vertical connection part 21 at the center of the line, instead of the phase delay unit 11. The vertical connection part 21 is a line for adjusting a phase difference between the first phase and the second phase to 180 degrees.

The side lobe suppression reception signal, of which the phase difference between the first phase and the second phase is adjusted to 180 degrees, is output to the radar 30.

The radar 30 is electrically connected to the main reception antennas 10 and the side lobe suppression antenna 20.

Referring to FIG. 2, the radar 30 includes a reception unit 31, a determination unit 32, and an azimuth measurement unit 33.

The reception unit 31 receives the main reception signals and the side lobe suppression reception signal, respectively, from the main reception antennas 10 and the side lobe suppression antenna 20.

The determination unit 32 compares the magnitude of the main reception signal with the magnitude of the side lobe suppression reception signal and determines whether the magnitude of the main reception signal is larger than the magnitude of the side lobe suppression reception signal. At this time, when the magnitude of the main reception signal is larger than the magnitude of the side lobe suppression reception signal in regions defined by intersecting points between the main reception signal and the side lobe suppression reception signal, the determination unit 32 determines the corresponding signal as a normal reception signal. On the other hand, when the magnitude of the side lobe suppression reception signal is larger than the magnitude of the main reception signal, the determination unit 32 determines the corresponding signal as an abnormal reception signal.

When it is determined by the determination unit 32 that the signal is the normal reception signal, the azimuth measurement unit 33 measures the azimuth of the target by using the above-described region within the intersecting points. That is, since the signals reflected and returned from the target have different phase differences according to directions, the azimuth measurement unit 33 calculates the azimuth reversely by using the phase difference. The azimuth Θ is calculated using Equation 1 below.

$$\Theta = \arcsin\left(\frac{\Delta\varphi \cdot c}{2\pi \cdot d \cdot f_T}\right) \quad \text{(Equation 1)}$$

where c is light constant, $\Delta\varphi$ is a phase difference, d is a distance between antennas, and $f_T$ is a frequency.

A method for measuring an azimuth in the radar system for the vehicle, which is configured as above, will be described below with reference to FIG. 3.

Figure 3:
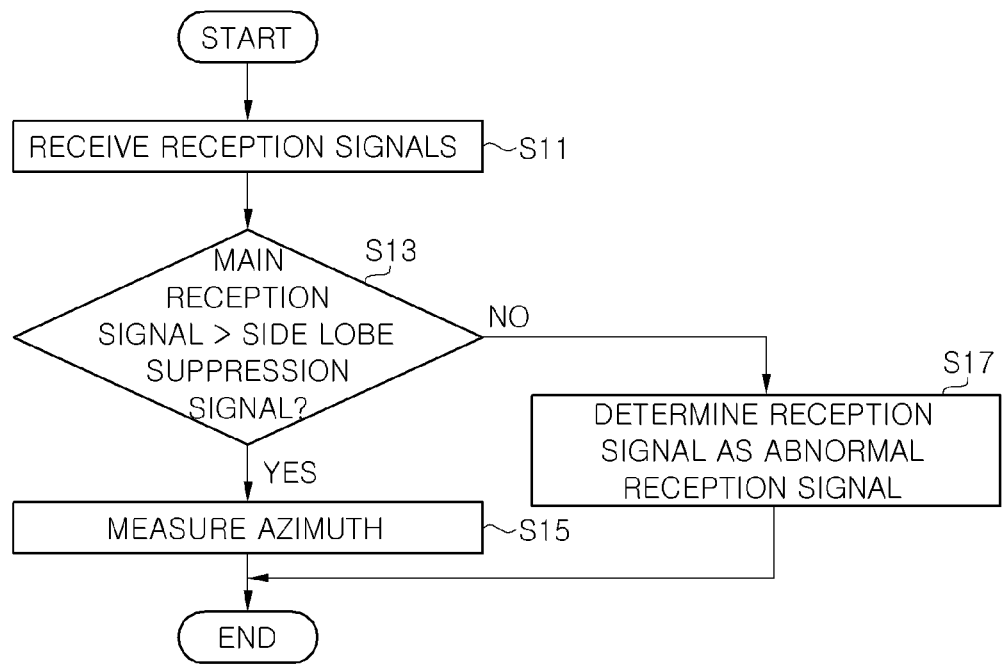
FIG. 3 is an operation flowchart for describing a method for measuring an azimuth in the radar system for the vehicle, according to an embodiment of the present invention.

FIG. 3 is an operation flowchart for describing a method for measuring an azimuth in the radar system for the vehicle, according to an embodiment of the present invention.

Figure 4:
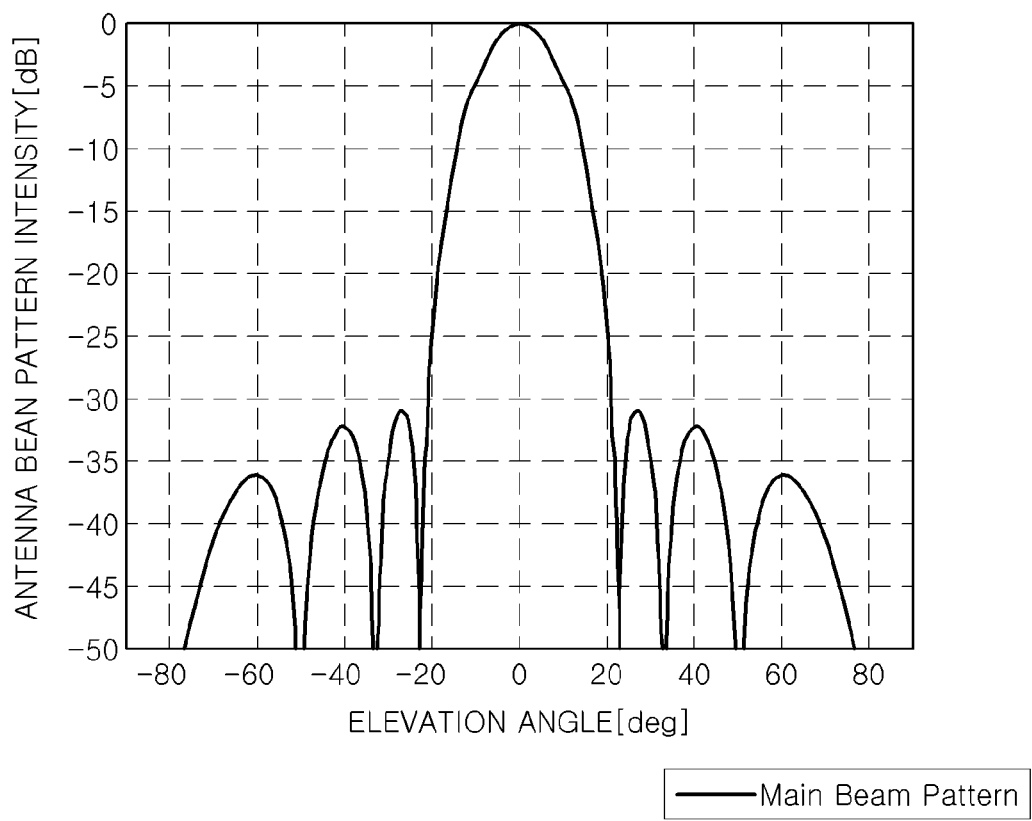
FIG. 4 is a graph showing main reception signals received from main reception antennas illustrated in FIG. 1.
Figure 5:
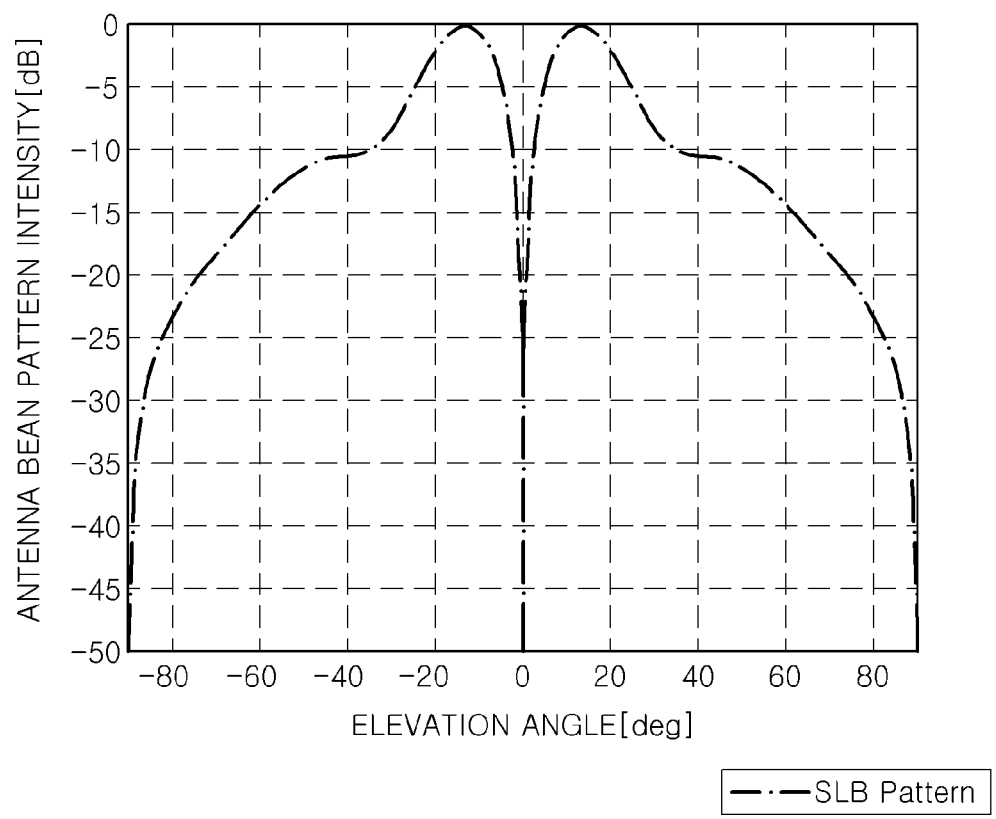
FIG. 5 is a graph showing a side lobe suppression reception signal received from a side lobe suppression antenna illustrated in FIG. 1.

Referring to FIG. 3, the radar 30 receives reception signals with respect to transmission signals, which are transmitted from the transmission antenna (not illustrated) to the target, from two or more main reception antennas 10 and the side lobe suppression antenna 20 (S11). FIG. 4 illustrates the reception signals received through the main reception antennas 10, and FIG. 5 is the reception signal received through the side lobe suppression antenna 20.

The radar 30 compares the magnitudes of the two received signals and determines whether the magnitude of the main reception signal received from the main reception antenna 10 is larger than the magnitude of the side lobe suppression reception signal received from the side lobe suppression antenna 20 (S13). At this time, the determining step is performed by determining whether the magnitude of the main reception signal is larger than the magnitude of the side lobe suppression reception signal in the region determined by intersecting points between the main reception signal and the side lobe suppression reception signal.

When it is determined in step S13 that the magnitude of the main reception signal is smaller than the magnitude of the side lobe suppression reception signal, the radar 30 determines that the main reception signal received in step S11 is an abnormal reception signal (S17).

When it is determined in step S13 that the magnitude of the main reception signal is larger than the magnitude of the side lobe suppression reception signal, the radar 30 determines that the main reception signal received in step S11 is a normal reception signal, and measures an azimuth of the target located in the sensing region defined by the intersecting points (S15).

Figure 6:
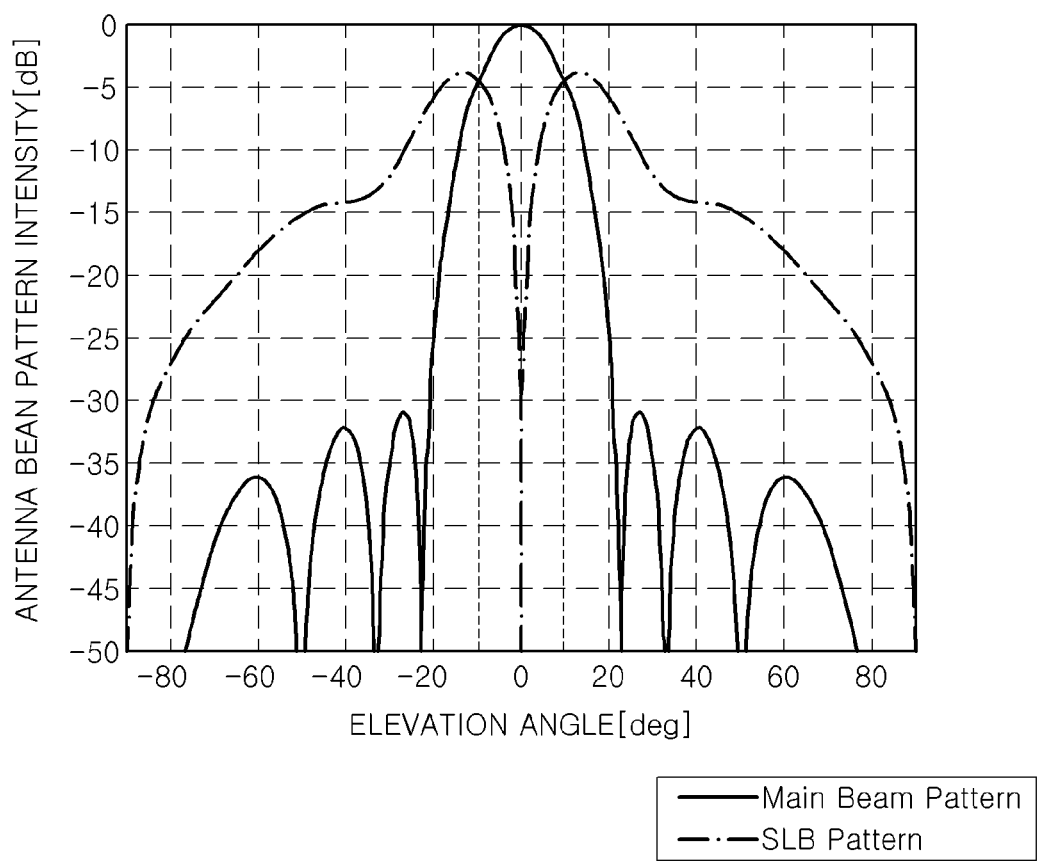
FIG. 6 is a graph showing intersecting points between the reception signals illustrated in FIGS. 4 and 5.

Referring to FIG. 6, the radar 30 may determine the intersecting points between the main reception signal and the side lobe suppression reception signal, and measure the azimuth by using the main reception signal in the region defined by the determined intersecting points. In FIG. 6, the reception signal located on the left side of the intersecting point is a reception signal received from the ground, and the reception signal located on the right side of the intersecting point is a reception signal received in an elevation angle direction.

As such, the radar 30 can determine only the region within the intersecting points as the sensing region and block an error signal from the ground or in the elevation angle direction, thereby improving the sensing reliability.

According to the embodiments of the present invention, it is possible to increase target sensing and tracking reliability by blocking an error signal that is input from the ground where no vehicle exists or in the elevation angle direction.

In addition, according to the embodiments of the present invention, it is possible to receive the side lobe suppression reception signal of the target by the structure in which the single side lobe suppression antenna is additionally installed in two or more main reception antennas.

According to the embodiments of the present invention, it is easy to make the side lobe suppression antenna which includes the vertical connection part provided at the position from which the phase delay unit is removed in the conventional reception antenna, so as to adjust the phase difference between the first phase and the second phase to 180 degrees.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: main reception antenna | 20: side lobe suppression antenna |
| 30: radar | 31: reception unit |
| 32: determination unit | 33: azimuth measurement unit |

What is claimed is:

1. A system for blocking a reflection signal from a ground surface or from an elevation angle direction, the system comprising:
   two or more main reception antennas configured to receive echo signals reflected from a target, and generate a main reception signal based on the received echo signals;
   a single side lobe suppression antenna configured to receive a side lobe suppression reception signal reflected from the ground surface or from the elevation angle direction; and
   a radar configured to
      compare a magnitude of the main reception signal with a magnitude of the received side lobe suppression reception signal, and
      calculate an azimuth angle of the target by using the received main reception signal when the magnitude of the main reception signal is larger than the magnitude of the side lobe suppression reception signal,
   wherein the azimuth angle is calculated by using the speed of light, a measured phase difference of the received echo signals, a distance between the two or more main reception antennas, and a frequency of the main reception signal, and
   wherein
      each main reception antenna of the two or more main reception antennas includes a phase delay unit installed in a center of a line of the each main reception antenna, and configured to adjust, by using the phase delay unit, a first phase and a second phase of the received echo signals with reference to the center of the line of the each main reception antenna, to have the same phase, in the radar, and
      the side lobe suppression antenna includes a vertical connection part installed in a center of a line of the side lobe suppression antenna, and configured to adjust, by using the vertical connection part, a first phase and a second phase of the side lobe suppression reception signal with reference to the center of the line of the side lobe suppression antenna, to have 180 degree phase difference, in the radar.

2. The system according to claim 1, wherein the radar includes:
   a reception unit configured to receive the main reception signal and the side lobe suppression reception signal from the main reception antennas and the side lobe suppression antenna;
   a determination unit configured to compare the magnitudes of the main reception signal and the side lobe suppression reception signal, which are received by the reception unit, and determine whether the magnitude of the main reception signal is larger than the magnitude of the side lobe suppression reception signal; and
   an azimuth measurement unit configured to, when it is determined by the determination unit that the magnitude of the main reception signal is larger, calculate the azimuth angle of the corresponding target by using the main reception signal within intersecting points between the main reception signal and the side lobe suppression reception signal.

3. A method for blocking a reflection signal from a ground surface or from an elevation angle direction, the method comprising:
   receiving echo signals, which are reflected and returned from a target, from two or more main reception antennas;

generating a main reception signal based on the received echo signals;

receiving a side lobe suppression reception signal, which is reflected and returned from the ground surface or from the elevation angle direction, from a single side lobe suppression reception antenna; and comparing a magnitude of the main reception signal received from the main reception antenna with a magnitude of the side lobe suppression reception signal received from the side lobe suppression antenna, and calculating an azimuth angle of the target by using the received main reception signal when the magnitude of the main reception signal is larger than the magnitude of the side lobe suppression reception signal, wherein the azimuth angle is calculated by using the speed of light, a measured phase difference between the received echo signals and the side lobe suppression reception signal, a distance between the two or more main reception antennas, and a frequency of the main reception signal, and wherein
  each main reception antenna of the two or more main reception antennas includes a phase delay unit installed in a center of a line of the each main reception antenna, and adjusts, by using the phase delay unit, a first phase and a second phase of the received echo signals with reference to the center of the line of the each main reception antenna, to have the same phase, in the radar, and
  the side lobe suppression antenna includes a vertical connection part installed in a center of a line of the side lobe suppression antenna, and adjusts, by using the vertical connection part, a first phase and a second phase of the side lobe suppression reception signal with reference to the center of the line of the side lobe suppression antenna, to have 180 degree phase difference, in the radar.

4. The method according to claim 3, wherein the step of calculating the azimuth angle of the target includes:
  determining intersecting points between the main reception signal and the side lobe suppression reception signal;
  determining whether the magnitude of the main reception signal is larger than the magnitude of the side lobe suppression reception signal within the determined intersecting points; and
  when it is determined that the magnitude of the main reception signal is larger, calculating the azimuth angle of the corresponding target by using the main reception signal within the intersecting points.

* * * * *